UNITED STATES PATENT OFFICE.

ARMIN HELFGOTT, OF UJ-PEST, AUSTRIA-HUNGARY, ASSIGNOR TO GENERAL ELECTRIC COMPANY, A CORPORATION OF NEW YORK.

METHOD OF PRODUCING MALLEABLE TUNGSTEN.

1,206,704.　　　　Specification of Letters Patent.　　Patented Nov. 28, 1916.

No Drawing.　　Application filed July 16, 1913.　Serial No. 779,268.

*To all whom it may concern:*

Be it known that I, ARMIN HELFGOTT, a subject of the Emperor of Austria-Hungary, residing at Uj-Pest, Austria-Hungary, have invented certain new and useful Improvements in Methods of Producing Malleable Tungsten, of which the following is a specification.

Mechanically workable bodies of tungsten, for example, those which may be hammered and drawn into wires, are, as is known, made by pressing dry tungsten powder into suitable forms and sintering the articles thus obtained. The properties of tungsten bodies obtained in this manner, as well as their behavior during mechanical working, are strongly influenced by the character of the tungsten powder which is used as the starting material for making the pressed articles.

If a very fine black or so-called amorphous tungsten, consisting of an almost impalpable powder, is taken to start with, very good pressed bodies are obtained by pressing this powder, as the fine particles of powder adhere strongly. If these pressed articles are sintered, however, there are apt to result bodies which possess a structure unsuitable for mechanical working, since they consist of quite large crystals with large surfaces and consequently are very readily broken and fall apart in mechanical working by hammering. In consequence allowance must be made in manufacturing for a great waste. Moreover, the fine black tungsten powder always contains oxid. The contained oxid also appears to have an injurious effect upon the properties of the product. If in the manufacture of the pressed bodies or sticks use is made of more or less granular (gray) tungsten, then other difficulties are to be reckoned with in pressing it. The adhesion between the individual granules is very slight and consequently the pressed article possesses only slight strength and breaks easily in handling. In the sintering process, however, such pressed articles behave better than those made of very fine black tungsten; they preserve their fine grained structure which has a favorable influence upon the formation of fibers in the subsequent working.

According to the present invention an initial or starting material is employed which combines the advantages of the materials above mentioned without possessing their disadvantages. To this end mixtures of granular tungsten with finely powdered tungsten are employed. In this case the finely powdered metal performs, so to speak, the function of a binder which cements together the individual grains of the granular metal. These bodies therefore may easily be pressed and can be conveniently handled in this condition; in sintering the bodies likewise behave advantageously, and since the finely powdered metal and the separate granules or particles of the granular metal are interspersed the formation of undesirably large grains is hindered, so that it is more easy to obtain the desired fine grained structure.

In order to obtain the fine tungsten powder free from oxid the finely powdered material, for example, that prepared according to the Delepine process, (see *Comptes Rendus*, 1900, vol. 131, page 184) must be heated in a current of hydrogen. By this treatment the color becomes somewhat brighter, the clear black changing over into a dark blackish gray, and at the same time the density increases without the fineness being perceptibly impaired. The fine grained blackish gray tungsten powder thus obtained is very well adapted to perform the function of the above-mentioned binder during the pressing of the granular tungsten metal.

What I claim as new and desire to secure by Letters Patent of the United States, is,—

1. The method of making tungsten bodies which consists in admixing coarse grained tungsten powder and very fine grained tungsten powder, pressing the mixture of powder to form a coherent mass, and sintering said mass.

2. The method of making mechanically workable tungsten bodies which consists in pressing into a coherent mass a mixture composed of granular powdered tungsten and finely powdered tungsten, and sintering the mass.

3. The method of producing tungsten bodies which consists in heating finely pulverized tungsten in a reducing atmosphere to free it from oxid while maintaining its fineness unimpaired, making an admixture composed of said finely pulverized oxid free tungsten and of granular tungsten, pressing said admixture to form a coherent mass, and sintering said coherent mass.

In witness whereof I have hereunto set my hand.

ARMIN HELFGOTT.